(12) United States Patent
Sahanga et al.

(10) Patent No.: US 12,263,619 B2
(45) Date of Patent: Apr. 1, 2025

(54) RECYCLING OF A SHOE

(71) Applicant: adidas AG, Herzogenaurach (DE)

(72) Inventors: Tanyaradzwa Sahanga, Herzogenaurach (DE); Eva Hofmann, Herzogenaurach (DE); Andreas Seefried, Herzogenaurach (DE); Juno Park, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 629 days.

(21) Appl. No.: 17/599,751

(22) PCT Filed: Apr. 1, 2020

(86) PCT No.: PCT/EP2020/059285
§ 371 (c)(1),
(2) Date: Sep. 29, 2021

(87) PCT Pub. No.: WO2020/201370
PCT Pub. Date: Oct. 8, 2020

(65) Prior Publication Data
US 2022/0143873 A1    May 12, 2022

(30) Foreign Application Priority Data
Apr. 1, 2019 (DE) .................... 10 2019 204 579.0

(51) Int. Cl.
*B29B 17/04* (2006.01)
*B29B 11/10* (2006.01)
(Continued)

(52) U.S. Cl.
CPC .......... *B29B 17/0412* (2013.01); *B29B 11/10* (2013.01); *D04H 1/724* (2013.01);
(Continued)

(58) Field of Classification Search
CPC ................ B29B 17/0412; B29B 11/10; B29B 2017/042; D04H 1/724; D04H 3/033
See application file for complete search history.

(56) References Cited

U.S. PATENT DOCUMENTS

D64,898 S     6/1924  Gunlock
2,131,756 A  10/1938  Roberts
(Continued)

FOREIGN PATENT DOCUMENTS

BR    102013002759 A2 †  10/2013
BR       MU9102933 U2 †   5/2017
(Continued)

OTHER PUBLICATIONS

Okorokov, "Shoes Report", Available Online at : https://shoes-report.com/articles/aktsenty/obuvnoy-likbez-iz-chego-delayutsya-obuvnye-podoshvy/#:-:text=PVC%20soles%20are%20most%20often,both%20options%20can%20be%20applied, Apr. 10, 2014, 14 pages.
(Continued)

*Primary Examiner* — Jamel M Nelson
(74) *Attorney, Agent, or Firm* — Kilpatrick Townsend & Stockton LLP

(57) ABSTRACT

The present invention provides a method for recycling a shoe (100), the shoe (100) comprising various components made from the same material class with varying densities, the method comprises milling (210) the shoe (100) to obtain a plurality of particles (212), the particles (212) having different material densities, mixing (240) the particles, applying heat (312) to the mixed particles (242) to obtain a melt of molten particles and extruding (317) the melt.

13 Claims, 5 Drawing Sheets

Figure 1:
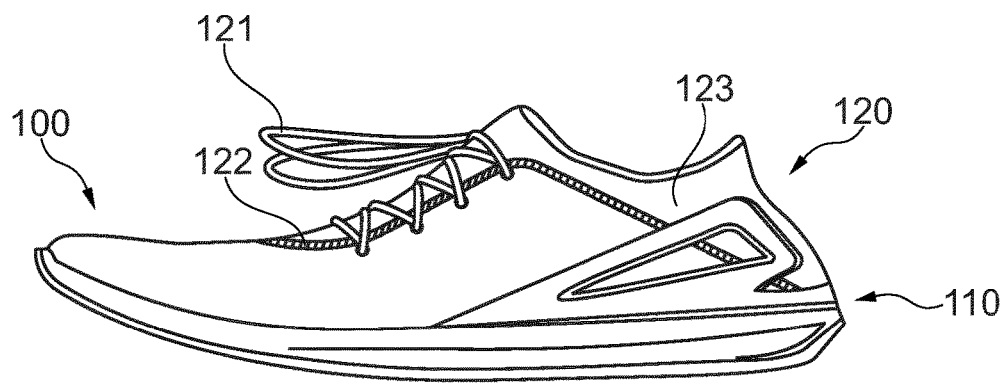

(51) Int. Cl.
*D04H 1/724* (2012.01)
*D04H 3/033* (2012.01)
*B29K 75/00* (2006.01)
*B29K 77/00* (2006.01)
*B29K 105/26* (2006.01)
*B29L 31/50* (2006.01)

(52) U.S. Cl.
CPC ........ *D04H 3/033* (2013.01); *B29B 2017/042* (2013.01); *B29K 2075/00* (2013.01); *B29K 2077/00* (2013.01); *B29K 2105/26* (2013.01); *B29L 2031/50* (2013.01)

(56) References Cited

U.S. PATENT DOCUMENTS

| | | |
|---|---|---|
| 2,968,106 A | 1/1961 | Joiner et al. |
| 3,186,013 A | 6/1965 | Glassman et al. |
| 3,586,003 A | 6/1971 | Baker |
| D237,323 S | 10/1975 | Inohara |
| 4,132,016 A | 1/1979 | Vaccari |
| 4,364,189 A | 12/1982 | Bates |
| 4,413,431 A | 11/1983 | Cavanagh |
| 4,481,727 A | 11/1984 | Stubblefield et al. |
| 4,524,529 A | 6/1985 | Schaefer |
| 4,546,559 A | 10/1985 | Dassler et al. |
| 4,624,062 A | 11/1986 | Autry |
| 4,642,911 A | 2/1987 | Talarico et al. |
| 4,658,515 A | 4/1987 | Oatman et al. |
| 4,667,423 A | 5/1987 | Autry et al. |
| D296,262 S | 6/1988 | Brown et al. |
| 4,754,561 A | 7/1988 | Dufour |
| D302,898 S | 8/1989 | Greenberg |
| RE33,066 E | 9/1989 | Stubblefield |
| 4,864,739 A | 9/1989 | Maestri |
| 4,922,631 A | 5/1990 | Anderie |
| 4,970,807 A | 11/1990 | Anderie et al. |
| 4,980,445 A | 12/1990 | van Der wal et al. |
| 5,025,573 A | 6/1991 | Giese et al. |
| D329,731 S | 9/1992 | Adcock et al. |
| 5,150,490 A | 9/1992 | Busch et al. |
| D333,556 S | 3/1993 | Purdom |
| D337,650 S | 7/1993 | Thomas, III et al. |
| D340,797 S | 11/1993 | Pallera et al. |
| 5,283,963 A | 2/1994 | Lerner et al. |
| 5,308,420 A | 5/1994 | Yang et al. |
| 5,319,866 A | 6/1994 | Foley et al. |
| D350,016 S | 8/1994 | Passke et al. |
| D350,222 S | 9/1994 | Hase |
| 5,381,607 A | 1/1995 | Sussmann |
| D356,438 S | 3/1995 | Opie et al. |
| 5,549,743 A | 8/1996 | Pearce |
| D375,619 S | 11/1996 | Backus et al. |
| 5,617,650 A | 4/1997 | Grim |
| 5,692,319 A | 12/1997 | Parker et al. |
| 5,709,954 A | 1/1998 | Lyden et al. |
| D389,991 S | 2/1998 | Elliott |
| D390,349 S | 2/1998 | Murai et al. |
| D393,340 S | 4/1998 | Doxey |
| 5,743,027 A | 4/1998 | Barma |
| D395,337 S | 6/1998 | Greene |
| D408,618 S | 4/1999 | Wilborn et al. |
| D408,971 S | 5/1999 | Birkenstock |
| D413,010 S | 8/1999 | Birkenstock |
| 5,932,336 A | 8/1999 | Petrovic et al. |
| D414,920 S | 10/1999 | Cahill |
| D415,610 S | 10/1999 | Cahill |
| D415,876 S | 11/1999 | Cahill |
| 5,996,252 A | 12/1999 | Cougar |
| 6,014,821 A | 1/2000 | Yaw |
| 6,029,376 A | 2/2000 | Cass |
| 6,041,521 A | 3/2000 | Wong |
| D422,400 S | 4/2000 | Brady et al. |
| D423,199 S | 4/2000 | Cahill |
| 6,108,943 A | 8/2000 | Hudson |
| D431,346 S | 10/2000 | Birkenstock |
| 6,237,251 B1 | 5/2001 | Litchfield et al. |
| D460,852 S | 7/2002 | Daudier |
| 6,516,540 B2 | 2/2003 | Seydel et al. |
| 6,702,469 B1 | 3/2004 | Taniguchi et al. |
| D490,222 S | 5/2004 | Burg et al. |
| D490,230 S | 5/2004 | Mervar |
| D492,099 S | 6/2004 | McClaskie |
| 6,782,640 B2 | 8/2004 | West et al. |
| 6,796,056 B2 | 9/2004 | Swigart |
| D498,901 S | 11/2004 | Hawker et al. |
| 6,849,667 B2 | 2/2005 | Haseyama et al. |
| 6,874,257 B2 | 4/2005 | Erickson |
| 6,910,288 B2 | 6/2005 | Dua |
| 6,925,734 B1 | 8/2005 | Schaeffer et al. |
| 6,948,263 B2 | 9/2005 | Covatch |
| 6,957,504 B2 | 10/2005 | Morris |
| D517,302 S | 3/2006 | Ardissono |
| 7,073,277 B2 | 7/2006 | Erb et al. |
| 7,086,179 B2 | 8/2006 | Dojan et al. |
| 7,143,529 B2 | 12/2006 | Robinson et al. |
| D538,518 S | 3/2007 | Della Valle |
| 7,202,284 B1 | 4/2007 | Limerkens et al. |
| D554,848 S | 11/2007 | Marston |
| D560,883 S | 2/2008 | McClaskie |
| D561,433 S | 2/2008 | McClaskie |
| D561,438 S | 2/2008 | Belley |
| D561,986 S | 2/2008 | Horne et al. |
| D570,581 S | 6/2008 | Moretti |
| D571,085 S | 6/2008 | McClaskie |
| D572,462 S | 7/2008 | Hatfield et al. |
| 7,421,805 B2 | 9/2008 | Geer |
| D586,090 S | 2/2009 | Turner et al. |
| D589,690 S | 4/2009 | Truelsen |
| D594,187 S | 6/2009 | Hickman |
| D596,384 S | 7/2009 | Andersen et al. |
| D601,333 S | 10/2009 | McClaskie |
| D606,733 S | 12/2009 | McClaskie |
| D607,190 S | 1/2010 | McClaskie |
| D611,233 S | 3/2010 | Della Valle et al. |
| 7,673,397 B2 | 3/2010 | Jarvis |
| D616,183 S | 5/2010 | Skaja |
| D617,540 S | 6/2010 | McClaskie |
| D618,891 S | 7/2010 | McClaskie |
| D631,646 S | 2/2011 | Müller |
| D633,286 S | 3/2011 | Skaja |
| D633,287 S | 3/2011 | Skaja |
| D634,918 S | 3/2011 | Katz et al. |
| D636,156 S | 4/2011 | Della Valle et al. |
| D636,569 S | 4/2011 | McMillan |
| D636,571 S | 4/2011 | Avar |
| 7,941,941 B2 | 5/2011 | Hazenberg et al. |
| D641,142 S | 7/2011 | Lindseth et al. |
| D644,827 S | 9/2011 | Lee |
| D645,649 S | 9/2011 | McClaskie |
| D648,105 S | 11/2011 | Schlageter et al. |
| D650,159 S | 12/2011 | Avar |
| 8,082,684 B2 | 12/2011 | Munns |
| D655,488 S | 3/2012 | Blakeslee |
| D659,364 S | 5/2012 | Jolicoeur |
| 8,186,081 B2 | 5/2012 | Wilson, III |
| D680,725 S | 4/2013 | Avar et al. |
| D680,726 S | 4/2013 | Propét |
| D683,116 S | 5/2013 | Petrie |
| 8,438,757 B2 | 5/2013 | Roser |
| 8,479,412 B2 | 7/2013 | Peyton et al. |
| 8,490,297 B2 | 7/2013 | Guerra |
| D693,553 S | 11/2013 | McClaskie |
| D695,501 S | 12/2013 | Yehudah |
| D698,137 S | 1/2014 | Carr |
| D707,934 S | 7/2014 | Petrie |
| D709,680 S | 7/2014 | Herath |
| 8,834,770 B2 | 9/2014 | Nakano et al. |
| D721,478 S | 1/2015 | Avent et al. |
| 9,010,157 B1 | 4/2015 | Podhajny et al. |
| D739,129 S | 9/2015 | Del Biondi |
| D739,131 S | 9/2015 | Del Biondi |
| D740,003 S | 10/2015 | Herath |
| D740,004 S | 10/2015 | Hoellmueller et al. |

(56) References Cited

U.S. PATENT DOCUMENTS

| | | |
|---|---|---|
| 9,212,270 B2 | 12/2015 | Künkel et al. |
| D758,056 S | 6/2016 | Herath et al. |
| D776,410 S | 1/2017 | Herath et al. |
| D783,264 S | 4/2017 | Hoellmueller et al. |
| 9,610,746 B2 | 4/2017 | Wardlaw et al. |
| 9,713,357 B2 | 7/2017 | Denison |
| 9,737,114 B2 | 8/2017 | Beye et al. |
| 9,781,970 B2 | 10/2017 | Angus et al. |
| 9,781,974 B2 | 10/2017 | Reinhardt |
| 9,788,598 B2 | 10/2017 | Reinhardt |
| 9,788,606 B2 | 10/2017 | Reinhardt |
| 9,820,528 B2 | 11/2017 | Reinhardt et al. |
| 9,833,039 B2 | 12/2017 | Smaldone et al. |
| 9,849,645 B2 | 12/2017 | Wardlaw et al. |
| D828,686 S | 9/2018 | Hoellmueller et al. |
| D828,991 S | 9/2018 | Herath |
| D840,136 S | 2/2019 | Herath et al. |
| D840,137 S | 2/2019 | Herath et al. |
| 10,259,183 B2 | 4/2019 | Wardlaw et al. |
| D851,889 S | 6/2019 | Dobson et al. |
| D852,475 S | 7/2019 | Hoellmueller et al. |
| D853,691 S | 7/2019 | Coonrod et al. |
| D853,699 S | 7/2019 | Coonrod et al. |
| D855,297 S | 8/2019 | Motoki |
| 10,506,846 B2 | 12/2019 | Wardlaw et al. |
| D873,543 S | 1/2020 | Coonrod et al. |
| D875,359 S | 2/2020 | Dobson et al. |
| D882,927 S | 5/2020 | Bruns et al. |
| D882,928 S | 5/2020 | Bruns et al. |
| D889,810 S | 7/2020 | Hoellmueller et al. |
| D891,051 S | 7/2020 | Smith et al. |
| 10,716,358 B2 | 7/2020 | Reinhardt et al. |
| D895,234 S | 9/2020 | Motoki et al. |
| D899,061 S | 10/2020 | Coonrod et al. |
| D906,648 S | 1/2021 | Hoellmueller |
| D915,055 S | 4/2021 | Herath et al. |
| D915,749 S | 4/2021 | Groneck |
| D916,444 S | 4/2021 | Callow et al. |
| D925,179 S | 7/2021 | Hoellmueller |
| D927,154 S | 8/2021 | Coonrod et al. |
| D928,479 S | 8/2021 | Le et al. |
| 2003/0131501 A1 | 7/2003 | Erickson et al. |
| 2003/0158275 A1 | 8/2003 | McClelland et al. |
| 2003/0172548 A1 | 9/2003 | Fuerst |
| 2003/0208925 A1 | 11/2003 | Pan |
| 2004/0032042 A1 | 2/2004 | Ch |
| 2004/0087230 A1 | 5/2004 | Wildeman |
| 2004/0138318 A1 | 7/2004 | McClelland et al. |
| 2004/0211088 A1 | 10/2004 | Volkart |
| 2005/0065270 A1 | 3/2005 | Knoerr et al. |
| 2005/0108898 A1 | 5/2005 | Jeppesen et al. |
| 2005/0150132 A1 | 7/2005 | Iannacone |
| 2005/0241181 A1 | 11/2005 | Cheng |
| 2006/0010717 A1 | 1/2006 | Finkelstein et al. |
| 2006/0026863 A1 | 2/2006 | Liu |
| 2006/0083912 A1 | 4/2006 | Park et al. |
| 2006/0125134 A1 | 6/2006 | Lin et al. |
| 2006/0134351 A1 | 6/2006 | Greene et al. |
| 2006/0156579 A1 | 7/2006 | Hoffer et al. |
| 2006/0235095 A1 | 10/2006 | Leberfinger et al. |
| 2006/0283046 A1 | 12/2006 | Mason |
| 2007/0193070 A1 | 8/2007 | Bertagna et al. |
| 2007/0199213 A1 | 8/2007 | Campbell et al. |
| 2007/0271821 A1 | 11/2007 | Meschter |
| 2007/0295451 A1 | 12/2007 | Willis |
| 2007/0296115 A1 | 12/2007 | Truelsen |
| 2008/0005856 A1 | 1/2008 | Hung |
| 2008/0052965 A1 | 3/2008 | Sato et al. |
| 2008/0060221 A1 | 3/2008 | Hottinger et al. |
| 2008/0244932 A1 | 10/2008 | Nau et al. |
| 2008/0250666 A1 | 10/2008 | Votolato |
| 2009/0013558 A1 | 1/2009 | Hazenberg et al. |
| 2009/0025260 A1 | 1/2009 | Nakano |
| 2009/0113758 A1 | 5/2009 | Nishiwaki et al. |
| 2009/0119023 A1 | 5/2009 | Zimmer et al. |
| 2009/0235557 A1 | 9/2009 | Christensen et al. |
| 2009/0277047 A1 | 11/2009 | Moretti |
| 2009/0320330 A1 | 12/2009 | Borel et al. |
| 2010/0005602 A1 | 1/2010 | Wu |
| 2010/0063778 A1 | 3/2010 | Schrock et al. |
| 2010/0102468 A1† | 4/2010 | Chen |
| 2010/0122472 A1 | 5/2010 | Wilson, III et al. |
| 2010/0154257 A1 | 6/2010 | Bosomworth et al. |
| 2010/0199520 A1 | 8/2010 | Dua et al. |
| 2010/0218397 A1 | 9/2010 | Nishiwaki et al. |
| 2010/0222442 A1 | 9/2010 | Prissok et al. |
| 2010/0242309 A1 | 9/2010 | McCann |
| 2010/0287788 A1 | 11/2010 | Spanks et al. |
| 2010/0287795 A1 | 11/2010 | Van Niekerk |
| 2010/0293811 A1 | 11/2010 | Truelsen |
| 2010/0293814 A1 | 11/2010 | Skaja et al. |
| 2010/0325921 A1 | 12/2010 | Wu |
| 2011/0047720 A1 | 3/2011 | Maranan et al. |
| 2011/0067272 A1 | 3/2011 | Lin |
| 2011/0124258 A1* | 5/2011 | White .................... D01D 5/14 264/211.14 |
| 2011/0138652 A1 | 6/2011 | Lucas et al. |
| 2011/0232135 A1 | 9/2011 | Dean et al. |
| 2011/0252668 A1 | 10/2011 | Chen |
| 2011/0283560 A1 | 11/2011 | Portzline et al. |
| 2011/0302805 A1 | 12/2011 | Vito |
| 2012/0005920 A1 | 1/2012 | Alvear et al. |
| 2012/0047770 A1 | 3/2012 | Dean et al. |
| 2012/0059075 A1 | 3/2012 | Prissok et al. |
| 2012/0060389 A1 | 3/2012 | Mille |
| 2012/0144698 A1 | 6/2012 | McDowell |
| 2012/0144702 A1 | 6/2012 | Wu |
| 2012/0177777 A1 | 7/2012 | Brown et al. |
| 2012/0233877 A1 | 9/2012 | Swigart |
| 2012/0233883 A1 | 9/2012 | Spencer et al. |
| 2012/0235322 A1 | 9/2012 | Greene et al. |
| 2012/0266490 A1 | 10/2012 | Atwal et al. |
| 2013/0150468 A1 | 6/2013 | Füssi et al. |
| 2013/0232815 A1 | 9/2013 | Meythaler et al. |
| 2013/0255103 A1 | 10/2013 | Dua |
| 2013/0266792 A1 | 10/2013 | Nohara et al. |
| 2013/0269215 A1 | 10/2013 | Smirman et al. |
| 2013/0291409 A1 | 11/2013 | Reinhardt et al. |
| 2013/0312284 A1 | 11/2013 | Berend et al. |
| 2014/0017450 A1 | 1/2014 | Baghdadi et al. |
| 2014/0026438 A1 | 1/2014 | Cortez et al. |
| 2014/0033573 A1 | 2/2014 | Wills |
| 2014/0066530 A1 | 3/2014 | Shen et al. |
| 2014/0075787 A1 | 3/2014 | Cartagena |
| 2014/0137965 A1 | 5/2014 | Truitt et al. |
| 2014/0197253 A1 | 7/2014 | Lofts et al. |
| 2014/0215851 A1 | 8/2014 | Solsona et al. |
| 2014/0223673 A1 | 8/2014 | Wardlaw et al. |
| 2014/0223776 A1 | 8/2014 | Wardlaw et al. |
| 2014/0223777 A1 | 8/2014 | Whiteman et al. |
| 2014/0223783 A1 | 8/2014 | Wardlaw et al. |
| 2014/0227505 A1 | 8/2014 | Schiller et al. |
| 2014/0237858 A1 | 8/2014 | Adami |
| 2014/0239878 A1 | 8/2014 | Yun et al. |
| 2014/0283410 A1 | 9/2014 | Marvin |
| 2014/0310986 A1 | 10/2014 | Tamm |
| 2014/0366403 A1 | 12/2014 | Reinhardt et al. |
| 2014/0366404 A1 | 12/2014 | Reinhardt et al. |
| 2014/0366405 A1 | 12/2014 | Reinhardt et al. |
| 2014/0373392 A1 | 12/2014 | Cullen |
| 2015/0082668 A1 | 3/2015 | Nakaya et al. |
| 2015/0089841 A1 | 4/2015 | Smaldone et al. |
| 2015/0143716 A1 | 5/2015 | Long et al. |
| 2015/0166270 A1 | 6/2015 | Buscher et al. |
| 2015/0174808 A1 | 6/2015 | Rudolph et al. |
| 2015/0197617 A1 | 7/2015 | Prissok et al. |
| 2015/0201707 A1 | 7/2015 | Bruce |
| 2015/0223552 A1 | 8/2015 | Love et al. |
| 2015/0237823 A1 | 8/2015 | Schmitt et al. |
| 2015/0344661 A1 | 12/2015 | Spies et al. |
| 2015/0351493 A1 | 12/2015 | Ashcroft et al. |
| 2016/0037859 A1 | 2/2016 | Smith et al. |
| 2016/0044992 A1 | 2/2016 | Reinhardt et al. |
| 2016/0046751 A1 | 2/2016 | Spies et al. |

(56) References Cited

U.S. PATENT DOCUMENTS

| | | | |
|---|---|---|---|
| 2016/0081418 A1 | 3/2016 | Amos et al. | |
| 2016/0093199 A1 | 3/2016 | Whitney et al. | |
| 2016/0095377 A1 | 4/2016 | Tamm | |
| 2016/0121524 A1* | 5/2016 | Däschlein | B29B 9/12 264/54 |
| 2016/0128426 A1 | 5/2016 | Reinhardt et al. | |
| 2016/0227876 A1 | 8/2016 | Le et al. | |
| 2016/0244583 A1 | 8/2016 | Keppeler | |
| 2016/0244584 A1 | 8/2016 | Keppeler | |
| 2016/0244587 A1 | 8/2016 | Gutmann et al. | |
| 2016/0278481 A1 | 9/2016 | Le et al. | |
| 2016/0295955 A1 | 10/2016 | Wardlaw et al. | |
| 2016/0302508 A1† | 10/2016 | Kormann | |
| 2016/0346627 A1 | 12/2016 | Le et al. | |
| 2017/0015825 A1* | 1/2017 | Ting | C08K 5/0025 |
| 2017/0119102 A1 | 5/2017 | McDowell | |
| 2017/0173910 A1 | 6/2017 | Wardlaw et al. | |
| 2017/0253710 A1 | 9/2017 | Smith et al. | |
| 2017/0259474 A1 | 9/2017 | Holmes et al. | |
| 2017/0340067 A1 | 11/2017 | Dyckmans et al. | |
| 2017/0341325 A1 | 11/2017 | Le et al. | |
| 2017/0341326 A1 | 11/2017 | Holmes et al. | |
| 2017/0341327 A1 | 11/2017 | Le et al. | |
| 2018/0000197 A1 | 1/2018 | Wardlaw et al. | |
| 2018/0035755 A1 | 2/2018 | Reinhardt et al. | |
| 2018/0110293 A1 | 4/2018 | Lebo | |
| 2018/0154598 A1 | 6/2018 | Kurtz et al. | |
| 2018/0206591 A1 | 7/2018 | Whiteman et al. | |
| 2018/0235310 A1 | 8/2018 | Wardlaw et al. | |
| 2018/0290349 A1 | 10/2018 | Kirupanantham et al. | |
| 2018/0303198 A1 | 10/2018 | Reinhardt et al. | |
| 2019/0021435 A1 | 1/2019 | Kormann et al. | |
| 2019/0193336 A1* | 6/2019 | Sybert | B29C 64/40 |
| 2019/0200699 A1 | 7/2019 | Ghiotti | |
| 2019/0291371 A1 | 9/2019 | Wardlaw et al. | |
| 2020/0060383 A1 | 2/2020 | Le et al. | |
| 2020/0113280 A1 | 4/2020 | Wardlaw et al. | |
| 2020/0221820 A1 | 7/2020 | Le et al. | |
| 2020/0230905 A1 | 7/2020 | Le et al. | |
| 2020/0253328 A1 | 8/2020 | Reinhardt et al. | |
| 2020/0315290 A1 | 10/2020 | Reinhardt et al. | |
| 2020/0329809 A1 | 10/2020 | Whiteman et al. | |
| 2020/0329812 A1 | 10/2020 | Le et al. | |
| 2020/0391417 A1 | 12/2020 | Smith | |
| 2021/0016531 A1 | 1/2021 | Kurtz et al. | |
| 2021/0161249 A1 | 6/2021 | Smith et al. | |

FOREIGN PATENT DOCUMENTS

| | | | |
|---|---|---|---|
| BR | 102016025941 A2 † | 5/2018 | |
| CA | 3083860 A1 † | 6/2019 | |
| CN | 1034662 A | 8/1989 | |
| CN | 1036128 A | 10/1989 | |
| CN | 1215424 A | 4/1999 | |
| CN | 2511160 Y | 9/2002 | |
| CN | 1646280 A | 7/2005 | |
| CN | 2796454 Y | 7/2006 | |
| CN | 2888936 Y | 4/2007 | |
| CN | 101107113 A | 1/2008 | |
| CN | 101190049 A | 6/2008 | |
| CN | 201223028 Y | 4/2009 | |
| CN | 101484035 A | 7/2009 | |
| CN | 101489683 A | 7/2009 | |
| CN | 101611950 A | 12/2009 | |
| CN | 202233324 U | 5/2012 | |
| CN | 102578759 A | 7/2012 | |
| CN | 202635746 U | 1/2013 | |
| CN | 102950671 A † | 3/2013 | |
| CN | 202907958 U | 5/2013 | |
| CN | 103371564 A | 10/2013 | |
| CN | 203692653 U | 7/2014 | |
| CN | 203828180 U | 9/2014 | |
| CN | 104106882 A | 10/2014 | |
| CN | 104290217 A | 1/2015 | |
| CN | 109111550 A † | 1/2019 | |
| DE | 3605662 C1 | 6/1987 | |
| DE | 4236081 A1 | 4/1994 | |
| DE | 29718491 U1 | 2/1998 | |
| DE | 19652690 A1 | 6/1998 | |
| DE | 19950121 C1 | 11/2000 | |
| DE | 10010182 A1 | 9/2001 | |
| DE | 10244433 B4 | 12/2005 | |
| DE | 10244435 B4 | 2/2006 | |
| DE | 102004063803 A1 | 7/2006 | |
| DE | 102005050411 A1 | 4/2007 | |
| DE | 202008017042 U1 | 4/2009 | |
| DE | 102008020890 A1 | 10/2009 | |
| DE | 102009004386 A1 | 7/2010 | |
| DE | 202010008893 U1 | 1/2011 | |
| DE | 202010015777 | 1/2011 | |
| DE | 112009001291 T5 | 4/2011 | |
| DE | 102010052783 A1 | 5/2012 | |
| DE | 202012005735 U1 | 8/2012 | |
| DE | 102011108744 A1 | 1/2013 | |
| DE | 102012206094 A1 | 10/2013 | |
| DE | 102012206094 U1 | 10/2013 | |
| DE | 102013202291 A1 | 8/2014 | |
| DE | 102013202353 A1 | 8/2014 | |
| DE | 102013208170 | 11/2014 | |
| DE | 102013012625 A1 | 2/2015 | |
| EM | 001286116-0001 | 7/2011 | |
| EM | 001286116-0002 | 7/2011 | |
| EM | 001286116-0003 | 7/2011 | |
| EM | 001286116-0004 | 7/2011 | |
| EM | 001286116-0005 | 7/2011 | |
| EM | 001286116-0006 | 7/2011 | |
| EP | 0165353 A1 | 12/1985 | |
| EP | 0752216 A2 | 1/1997 | |
| EP | 0873061 B1 | 10/1998 | |
| EP | 1197159 A1 | 4/2002 | |
| EP | 1424105 A1 | 6/2004 | |
| EP | 1197159 B1 | 9/2004 | |
| EP | 1541048 A1 | 6/2005 | |
| EP | 1854620 A1 | 11/2007 | |
| EP | 1872924 A1 | 1/2008 | |
| EP | 2110037 A1 | 10/2009 | |
| EP | 2233021 A2 | 9/2010 | |
| EP | 2250917 A1 | 11/2010 | |
| EP | 2316293 A1 | 5/2011 | |
| EP | 2342986 A1 | 7/2011 | |
| EP | 2446768 A2 | 5/2012 | |
| EP | 2649896 A2 | 10/2013 | |
| EP | 2649898 A1 | 10/2013 | |
| EP | 2540184 B1 | 7/2014 | |
| EP | 2792261 A1 | 10/2014 | |
| EP | 2848144 A1 | 3/2015 | |
| EP | 2939558 A1 | 11/2015 | |
| EP | 3081109 B1 | 4/2016 | |
| EP | 3067100 A1 | 9/2016 | |
| EP | 3590998 A1 † | 1/2020 | |
| EP | 3922665 A1 | 12/2021 | |
| ES | 1073997 U | 6/2011 | |
| FR | 2683432 A1 | 5/1993 | |
| FR | 2958835 A3 | 10/2011 | |
| GB | 1172210 A | 11/1969 | |
| GB | 2258801 A | 2/1993 | |
| JP | H01-274705 A | 11/1989 | |
| JP | H04-502780 A | 5/1992 | |
| JP | H06-46483 U | 6/1994 | |
| JP | H07-024437 A | 1/1995 | |
| JP | H10-152575 A | 11/1996 | |
| JP | H08-323890 A | 12/1996 | |
| JP | H09-150467 A | 6/1997 | |
| JP | H10-128305 A | 5/1998 | |
| JP | 2000-197503 A | 7/2000 | |
| JP | 2002-272506 A | 9/2002 | |
| JP | 2002-283473 A † | 10/2002 | |
| JP | 2002-301778 A † | 10/2002 | |
| JP | 2002-361749 A | 12/2002 | |
| JP | 2003-135105 A † | 5/2003 | |
| JP | 2003-145610 A | 5/2003 | |
| JP | 2005-218543 A | 8/2005 | |
| JP | 2006-192723 A † | 7/2006 | |

(56) References Cited

FOREIGN PATENT DOCUMENTS

| | | | |
|---|---|---|---|
| JP | 2006-192750 A † | 7/2006 | |
| JP | 2007-504295 A | 3/2007 | |
| JP | 2007-516109 A | 6/2007 | |
| JP | 2008-073548 A | 4/2008 | |
| JP | 2008-543401 A | 12/2008 | |
| JP | 2012-062615 A | 3/2012 | |
| JP | 4920138 B2 * | 4/2012 | |
| JP | 2012-512698 A | 6/2012 | |
| JP | 2014-210179 A | 11/2014 | |
| KR | 10-2008-0065393 A † | 7/2008 | |
| KR | 20080065393 A | 7/2008 | |
| KR | 1020110049293 A | 5/2011 | |
| TW | 445138 B | 7/2001 | |
| TW | 200917985 A | 5/2009 | |
| TW | 201012407 A1 | 4/2010 | |
| WO | 1989/06501 A1 | 7/1989 | |
| WO | 1994/020568 A1 | 9/1994 | |
| WO | 02/00432 A1 † | 1/2002 | |
| WO | 2002/000432 A1 | 1/2002 | |
| WO | 2002/008322 A1 | 1/2002 | |
| WO | 03/030795 A2 † | 4/2003 | |
| WO | 2003/030795 A2 | 4/2003 | |
| WO | 03/076170 A1 † | 9/2003 | |
| WO | 2003/076170 A1 | 9/2003 | |
| WO | 2005/023920 A1 | 3/2005 | |
| WO | 2005/026243 A1 | 3/2005 | |
| WO | 2005/038706 A2 | 4/2005 | |
| WO | 2005/066250 A1 | 7/2005 | |
| WO | 2006/015440 A | 2/2006 | |
| WO | 2006/027671 A1 | 3/2006 | |
| WO | 2006/034807 A1 | 4/2006 | |
| WO | 2006/090221 A1 | 8/2006 | |
| WO | 2007/082838 A1 | 7/2007 | |
| WO | 2008/047538 A1 | 4/2008 | |
| WO | 2008/087078 A1 | 7/2008 | |
| WO | 2009/039555 A1 | 4/2009 | |
| WO | 2009/095935 A1 | 8/2009 | |
| WO | 2010/010010 A1 | 1/2010 | |
| WO | 2010/037028 A1 | 4/2010 | |
| WO | 2010/045144 A2 | 4/2010 | |
| WO | 2010/080182 A1 | 7/2010 | |
| WO | 2010/090923 A2 | 8/2010 | |
| WO | 2010/120955 A1 † | 10/2010 | |
| WO | 2010/136398 A1 | 12/2010 | |
| WO | 2011/035236 A2 | 3/2011 | |
| WO | 2011/134996 A1 | 11/2011 | |
| WO | 2012/065926 A1 | 5/2012 | |
| WO | 2013/013784 A1 | 1/2013 | |
| WO | 2013/151987 A2 | 10/2013 | |
| WO | 2013/168256 A1 | 11/2013 | |
| WO | 2013/169351 A2 | 11/2013 | |
| WO | 2014/046940 A1 | 3/2014 | |
| WO | 2015/052265 A1 | 4/2015 | |
| WO | 2015/052267 A1 | 4/2015 | |
| WO | 2015/075546 A1 | 5/2015 | |
| WO | 2018209005 A1 † | 11/2018 | |
| WO | 2021/155892 A1 † | 8/2021 | |

OTHER PUBLICATIONS

Office Action, Chinese Patent Application No. 202080025564.4, Apr. 11, 2023, 11 pages.
Third Party Submission #1, Feb. 3, 2023, 28 pages.
Third Party Submission #2, Feb. 3, 2023, 37 pages.
Third Party Submission #3, Feb. 3, 2023, 12 pages.
Office Action, Chinese Patent Application No. 202080025564.4, Nov. 11, 2022, 11 pages.
Third Party Submission, U.S. Appl. No. 17/178,838, filed Oct. 20, 2022, 9 pages.
Third Party Submission, U.S. Appl. No. 17/178,838, filed Oct. 27, 2022, 45 pages.
Grounds for Decision on Opposition, European Application No. 16165059.3, Jun. 3, 2022, 21 pages.
Minutes from Oral Proceedings, European Patent Application No. 16165059.3, Jun. 3, 2022, 2 pages.
Reply to Notice of Opposition, European Patent Application No. 16165059.3, Jun. 2, 2020, 83 pages.
Statement on Grounds for Appeal (adidas AG), European Patent Application No. 16165059.3, Oct. 7, 2022, 27 pages.
Transmittal on Decision on Opposition, European Patent Application No. 16165059.3, Apr. 15, 2021, 49 pages.
Statement on Grounds for Appeal (On Clouds GmbH), European Patent Application No. 16165059.3, Oct. 11, 2022, 35 pages.
Written Submission for Oral Proceedings, European Patent Application No. 16165059.3, Sep. 24, 2021, 92 pages.
"Thermoplastic Polyurethane Elastomers (TPU)", Elastollan®—Material Properties, BASF, Feb. 2005, 43 pages.
Wikipedia—Monofil (Monofilament), https://de.wikipedia.org/w/index.php?title=Monofil&oldid=140642567, Apr. 7, 2015, 3 pages.
Wikipedia—Polyurethane, https://de.wikipedia.org/w/index.php?title=Polyurethane&oldid=140230836, Mar. 24, 2015, 14 pages.
Wikipedia, Garn (Yarn), https://de.wikipedia.org/w/index.php?title=Garn&oldid=139614741 1/, Mar. 9, 2015, Mar. 9, 2015.
Wikipedia, Vliesstoff (Nonwovens), https://de.wikipedia.org/w/index.php?title=Vliesstoff&oldid=140680573, Apr. 8, 2015, 44 pages.
Arenz, "Elastollan®—TPU", Thermoplastic Polyurethanes of Elastogran, Apr. 2009, 37 pages.
Kim et al., "Improving Shoe Performance and Increasing Automation in Footwear Production with New TPU Foam", TPE Magazine, 2015, 5 pages.
Nähgarn , www.Kurzwarenland.de/Naehlexikon/Naehgarn, Mar. 30, 2015, 3 pages.
Perret, "From Castor Oil to Specialty Polymides: The Success of the Diversification", Oct. 2014, 32 pages.
Sonnenschein, "Polyurethanes Science, Technology, Markets and Trends", 2015, 444 pages.
Decision of Rejection, Chinese Application No. 202080025564.4, Aug. 29, 2023, 11 pages.
U.S. Appl. No. 15/130,012, filed Apr. 15, 2016, Kormann et al.
Amesöder et al., The right turn (part 1)—Determination of Characteristic values for assembly injection molding, Journal of Plastics Technology, Apr. 2008, pp. 1-8 (English translation of Abstract provided).
Baur et al., Saechtling Kunststoff Taschenbuc, Hanser Verlag, 31 Ausgabe, Oct. 2013, 18 pages.
Venable LLP, Letter, dated Jan. 14, 2016, 6 pages.
"https://www.britannica.com/print/article/463684", Aug. 17, 2016, 15 pgs.
"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.
"http://www.dow.com/polyethylene/na/en/fab/foaming.htm", Dec. 7, 2011, 1 page.
Nauta, "Stabilisation of Low Density, Closed Cell Polyethylene Foam", University of Twente, Netherlands, 2000, 148 pages.
Third Party Submission, U.S. Appl. No. 14/981,168, filed Nov. 14, 2016, 44 pages.
AZO Materials , ""BASF Develops Expanded Thermoplastic Polyurethane", available http://www.azom.com/news.aspxNewsID=37360", Jul. 2, 2013, 4 pages.
U.S. Appl. No. 62/137,139, filed Mar. 23, 2015, Unpublished.
U.S. Appl. No. 29/679,962, filed Feb. 12, 2019, Unpublished.
Wikipedia, Thermoplastic Polyurethane, 4 pages, Admitted Prior Art.
U.S. Appl. No. 29/760,713, filed Dec. 3, 2020, Unpublished.
U.S. Appl. No. 29/721,029, filed Jan. 17, 2020, Unpublished.
U.S. Appl. No. 29/730,512, filed Apr. 6, 2020, Unpublished.
International Search Report, PCT Patent Application No. PCT/EP2020/059285, Jul. 20, 2020, 3 pages.
Written Opinion, PCT Patent Application No. PCT/EP2020/059285, Jul. 20, 2020, 7 pages.

(56) References Cited

OTHER PUBLICATIONS

European Search Report, European Patent Application No. 24201654.1, Jan. 7, 2025, 9 pages.

\* cited by examiner
† cited by third party

RECYCLING OF A SHOE

CROSS-REFERENCE TO RELATED APPLICATION

This application is a national stage entry of PCT/EP2020/059285, filed on Apr. 1, 2020, which claims priority to German Patent Application No. 10 2019 204 579.0, filed on Apr. 1, 2019, the entire contents and disclosures of which are incorporated by reference herein.

TECHNICAL FIELD

The present invention relates to a method of recycling a shoe, a shoe comprising a material obtained by the recycling method and an apparatus for recycling a shoe.

BACKGROUND

Recycling of conventional shoes is a complicated and expensive endeavor, which is therefore most of the time omitted. Thus, old shoes typically end up either in a landfill site or they are incinerated. This results in a loss of valuable raw material and natural resources and furthermore in growing piles of garbage. The reason for the complicated recycling process is mostly based on having up to 40 different types of materials almost inseparably glued or stitched together in the production of a conventional shoe.

To address this issue, EP 3 081 109 B1 of applicant discloses a shoe, in particular a sports shoe, which comprises an upper, wherein a majority by weight of the upper is made from a thermoplastic base material, and a sole, wherein a majority by weight of the sole is made from the same thermoplastic base material. By providing a shoe with a sole and an upper which—by majority or even entirely—consist of the same base material, the shoe may be easier recycled.

However, recycling such a shoe containing mostly one material or one material class still entails significant difficulties. A typical shoe comprises multiple components serving different functions such as cushioning and support for the sole, a comfortable fit to the foot for the upper, reliable stability for eyelets for laces, etc. In case of a shoe consisting partly or fully of the same material class, the respective material properties are usually achieved by involving different densities. However, recycling such a plurality of different material densities in a way that the result of the recycling process may be used not only for new products with less stringent requirements on the material quality but again for the manufacture of new shoes is still a challenge.

It is therefore the problem underlying the present invention to provide a recycling method and apparatus as well as a recycled shoe which at least partly overcome the above outlined disadvantages of the prior art.

SUMMARY OF THE INVENTION

In some aspects, the present invention is directed to a method for recycling a shoe, the shoe comprising various components made from the same material class with varying densities, the method comprising: a. milling the shoe to obtain a plurality of particles, the particles having different material densities; b. mixing the particles; c. applying heat to the mixed particles to obtain a melt of molten particles; and d. extruding the melt. The method may further comprise the step of applying heat and pressure to the shoe, in particular prior to the milling. The method may further comprise the step of adding new material to the mixed particles and/or the melt. In some aspects, the new material may be unrecycled material of the same material class as the shoe. In some aspects, the new material may be from a different material class. The new material may be an additive comprising a bi-functional isocyanate, a trifunctional isocyanate, a bifunctional epoxide or a multifunctional epoxide. The same material class may comprise a thermoplastic polymer, in particular thermoplastic polyurethane, TPU, or polyamide. A majority of weight of the shoe may be made from the same material class, in particular wherein at least 70%, preferably at least 80%, more preferable at least 90%, and most preferably at least 95% of the weight of the shoe may be made from the same material class. In some aspects, the step of extruding may comprise extruding an intermediate product for further thermoplastic processing. The further thermoplastic processing may comprise a melt-blowing process to manufacture a melt-blown non-woven fabric. The step of extruding may comprise extruding an intermediate product adapted for the manufacture of a new shoe without further thermoplastic processing. The step of producing a new shoe or a component for a new shoe may comprise using the extruded melt. The component for the new shoe may comprise a padding and/or cushioning element. In some aspects, the step of extruding may comprise a plurality of extrusion steps with different processing parameters.

In some aspects, the present invention is directed to a shoe comprising a material obtained by a recycling method. The recycling method may comprise forming various components made from the same material class with varying densities. The method may comprise: a. milling the shoe to obtain a plurality of particles, the particles having different material densities; b. mixing the particles; c. applying heat to the mixed particles to obtain a melt of molten particles; and d. extruding the melt. The method may further comprise the step of applying heat and pressure to the shoe, in particular prior to the milling.

The method may further comprise the step of adding new material to the mixed particles and/or the melt. In some aspects, the new material may be unrecycled material of the same material class as the shoe. In some aspects, the new material may be from a different material class. The new material may be an additive comprising a bi-functional isocyanate, a trifunctional isocyanate, a bifunctional epoxide or a multifunctional epoxide. The same material class may comprise a thermoplastic polymer, in particular thermoplastic polyurethane, TPU, or polyamide. A majority of weight of the shoe may be made from the same material class, in particular wherein at least 70%, preferably at least 80%, more preferable at least 90%, and most preferably at least 95% of the weight of the shoe may be made from the same material class. In some aspects, the step of extruding may comprise extruding an intermediate product for further thermoplastic processing. The further thermoplastic processing may comprise a melt-blowing process to manufacture a melt-blown non-woven fabric. The step of extruding may comprise extruding an intermediate product adapted for the manufacture of a new shoe without further thermoplastic processing. The step of producing a new shoe or a component for a new shoe may comprise using the extruded melt. The component for the new shoe may comprise a padding and/or cushioning element. In some aspects, the step of extruding may comprise a plurality of extrusion steps with different processing parameters.

In some aspects, the present invention is directed to an apparatus adapted to recycle a shoe, the shoe comprising various components made from the same material class with varying densities. The apparatus may comprise a mean to perform a method, wherein the method comprises: a. milling the shoe to obtain a plurality of particles, the particles having different material densities; b. mixing the particles; c. applying heat to the mixed particles to obtain a melt of molten particles; and d. extruding the melt. The method may further comprise the step of applying heat and pressure to the shoe, in particular prior to the milling.

The method may further comprise the step of adding new material to the mixed particles and/or the melt. In some aspects, the new material may be unrecycled material of the same material class as the shoe. In some aspects, the new material may be from a different material class. The new material may be an additive comprising a bi-functional isocyanate, a trifunctional isocyanate, a bifunctional epoxide or a multifunctional epoxide. The same material class may comprise a thermoplastic polymer, in particular thermoplastic polyurethane, TPU, or polyamide. A majority of weight of the shoe may be made from the same material class, in particular wherein at least 70%, preferably at least 80%, more preferable at least 90%, and most preferably at least 95% of the weight of the shoe may be made from the same material class. In some aspects, the step of extruding may comprise extruding an intermediate product for further thermoplastic processing. The further thermoplastic processing may comprise a melt-blowing process to manufacture a melt-blown non-woven fabric. The step of extruding may comprise extruding an intermediate product adapted for the manufacture of a new shoe without further thermoplastic processing. The step of producing a new shoe or a component for a new shoe may comprise using the extruded melt. The component for the new shoe may comprise a padding and/or cushioning element. In some aspects, the step of extruding may comprise a plurality of extrusion steps with different processing parameters.

SHORT DESCRIPTION OF THE FIGURES

Figure 2:
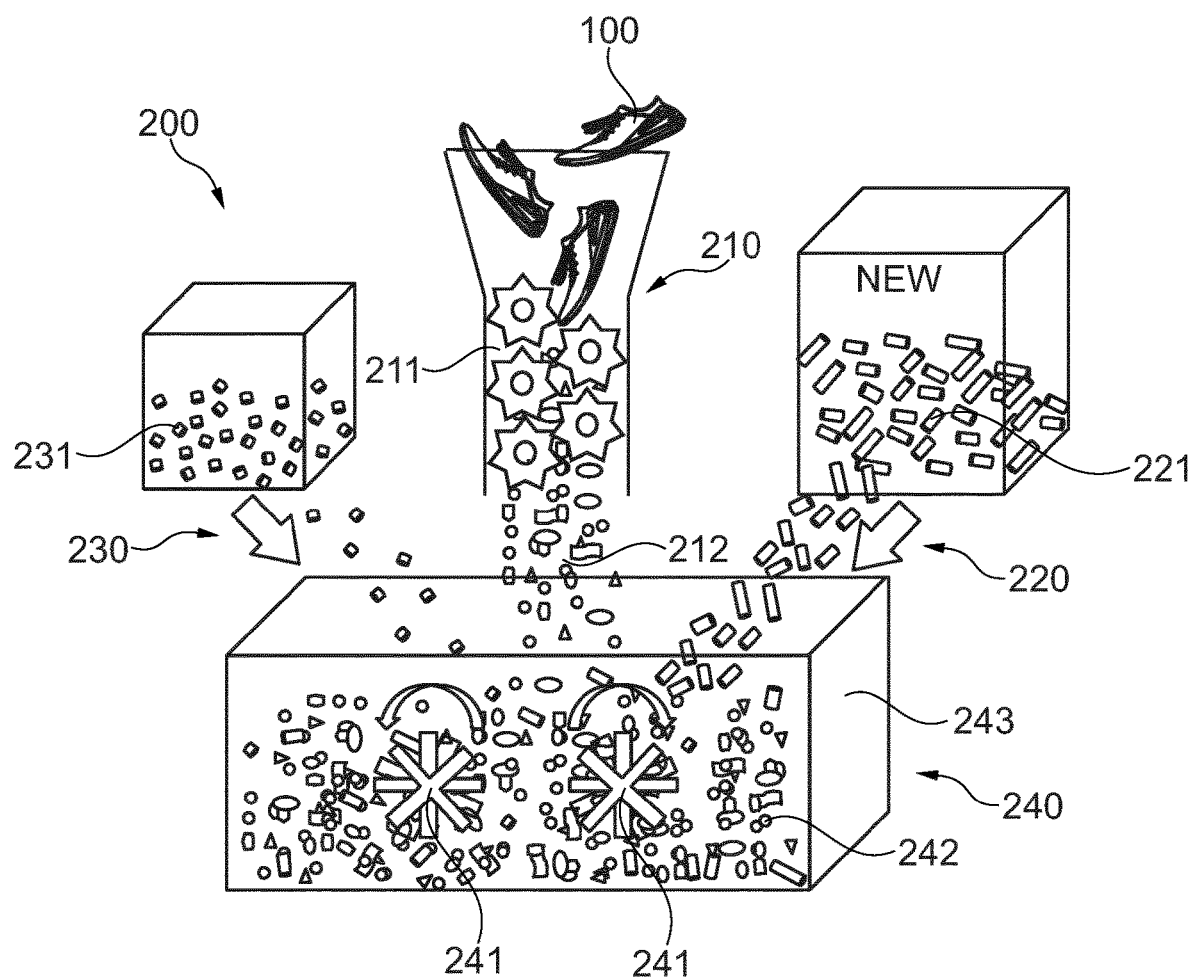
Figure 3:
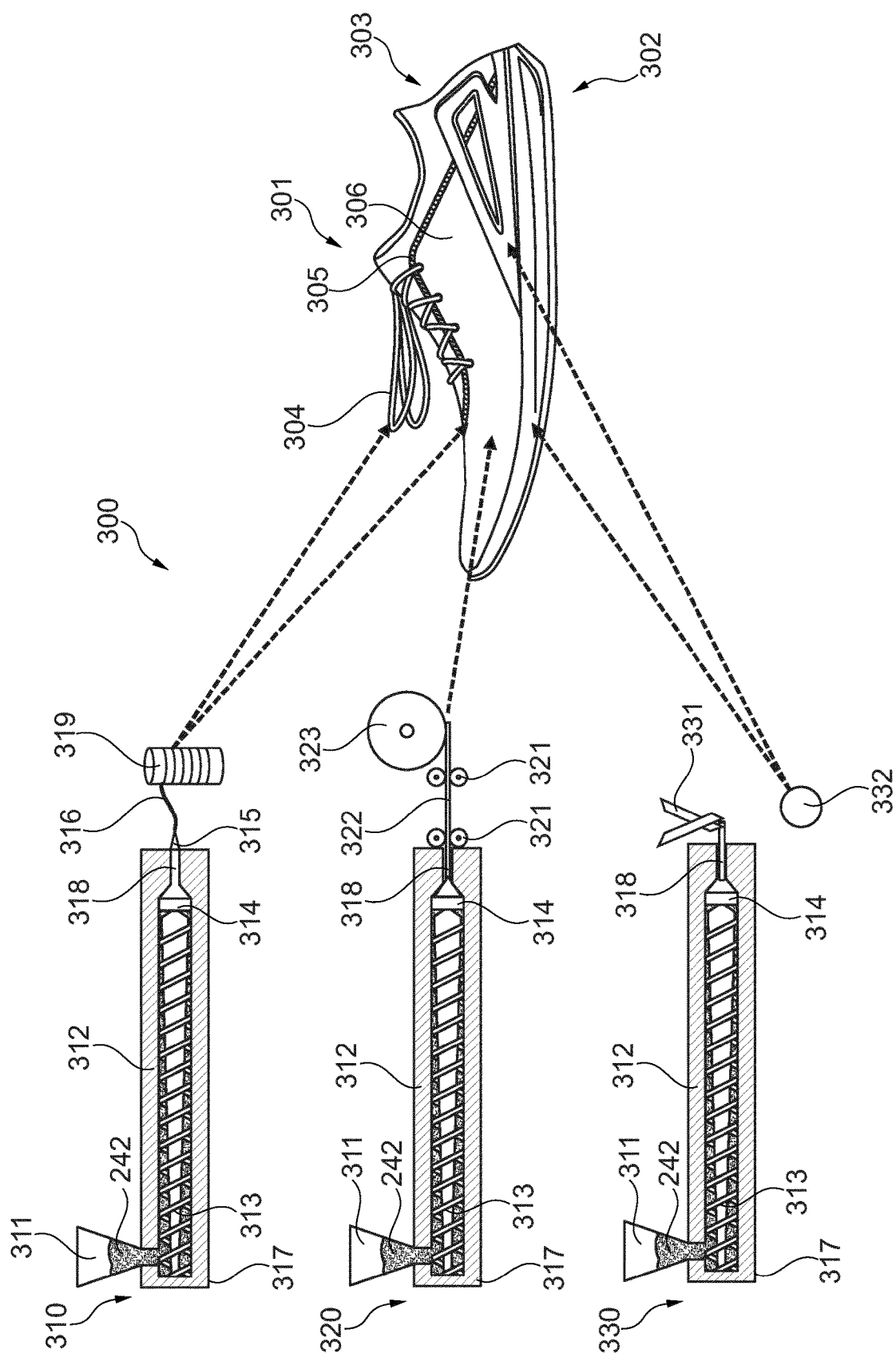
Figure 4:
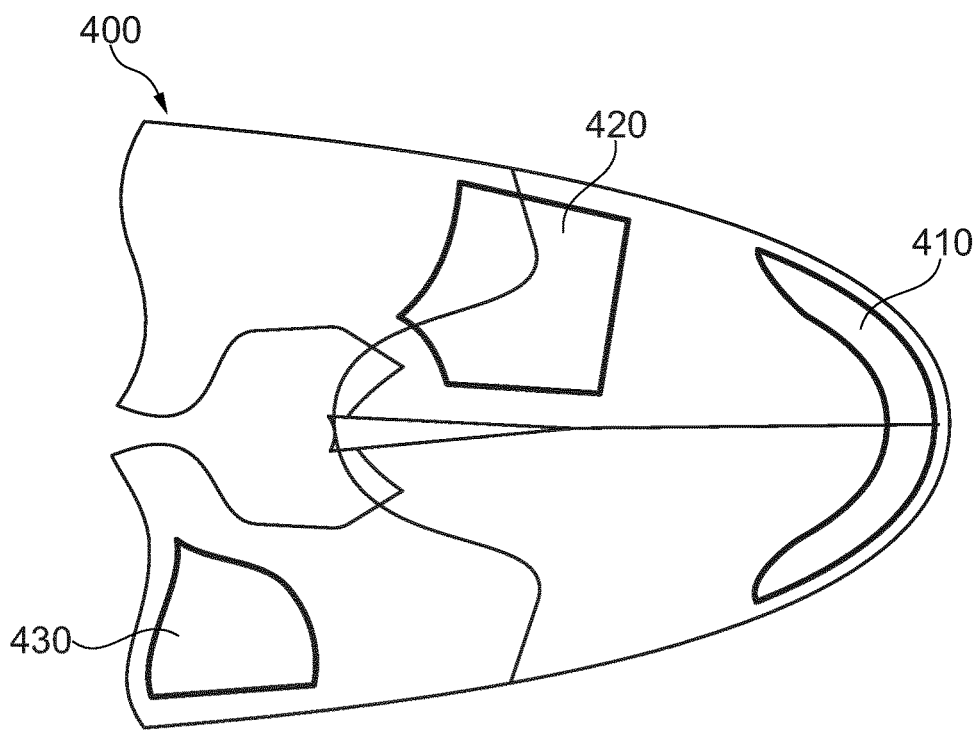
Figure 5:
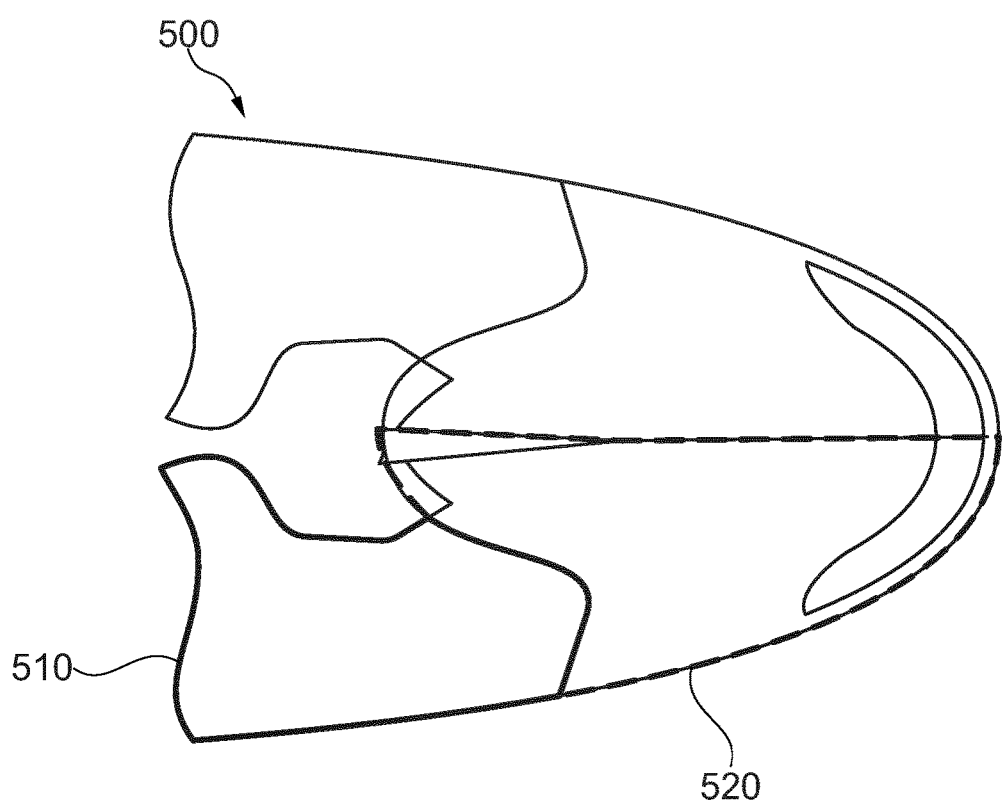
Figure 6:
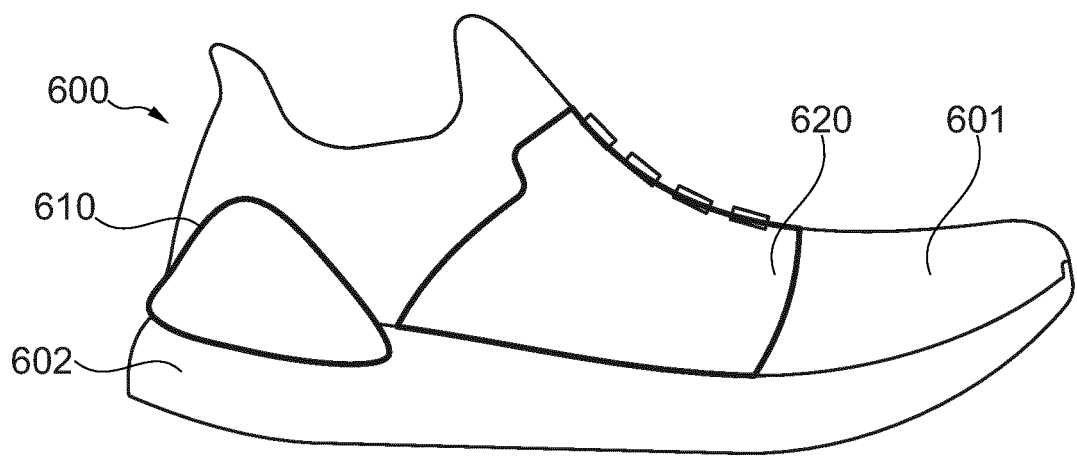
Figure 7:
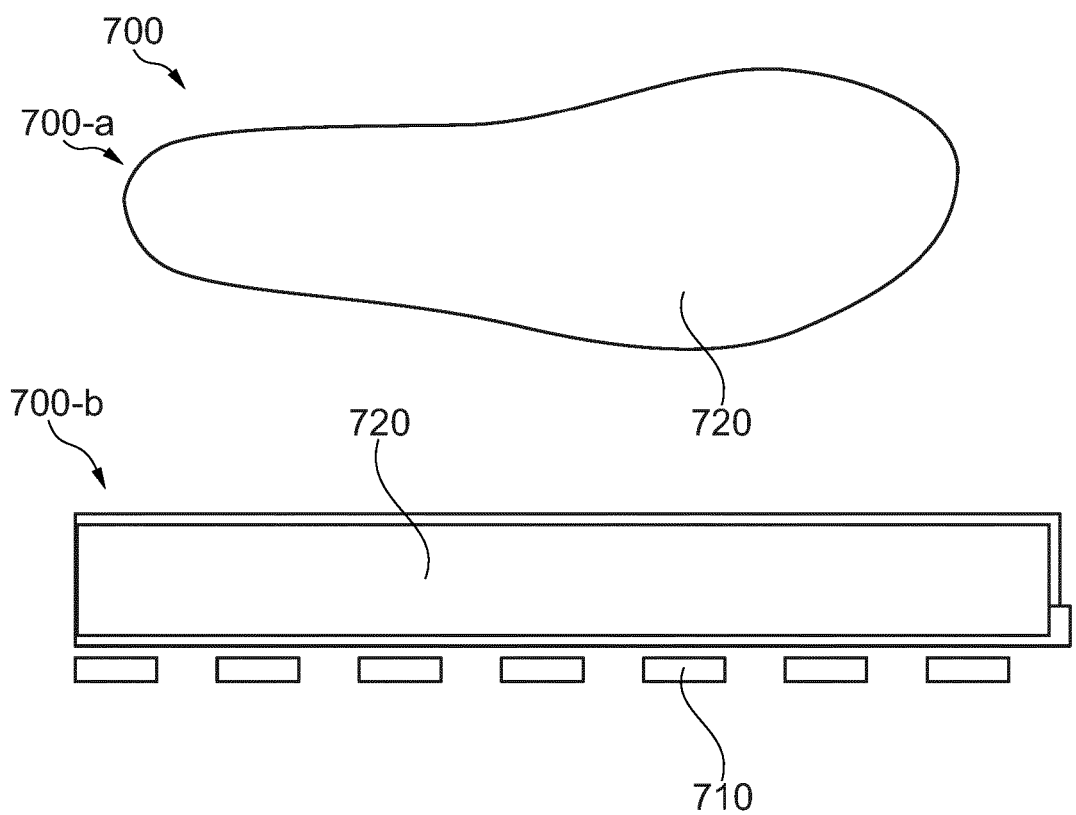
Figure 8A:
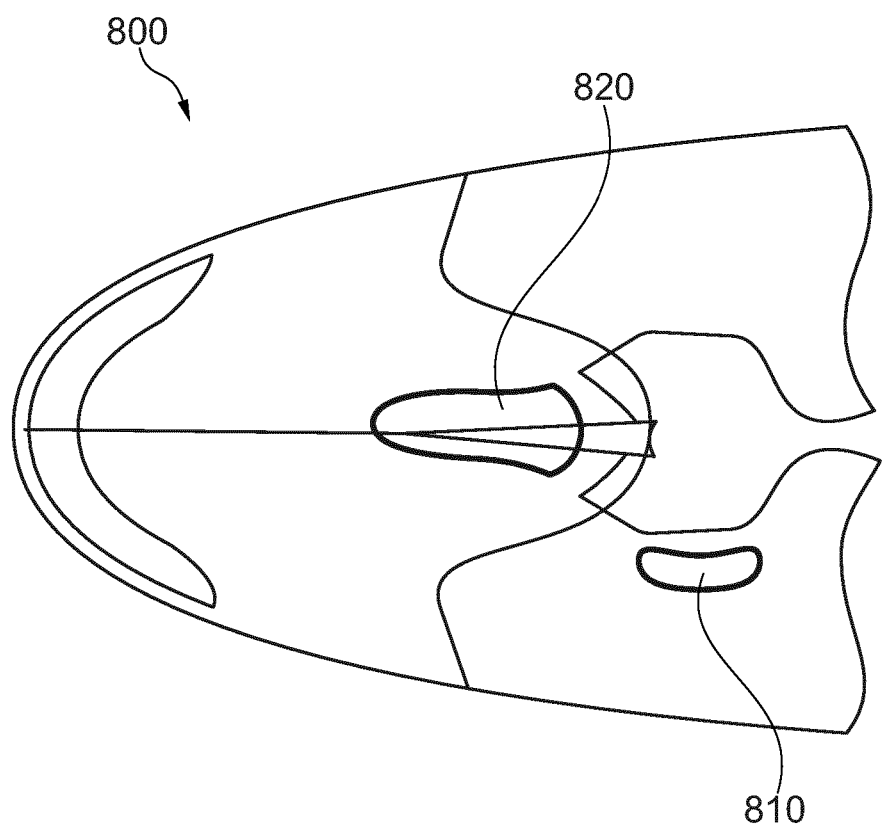
Figure 8B:
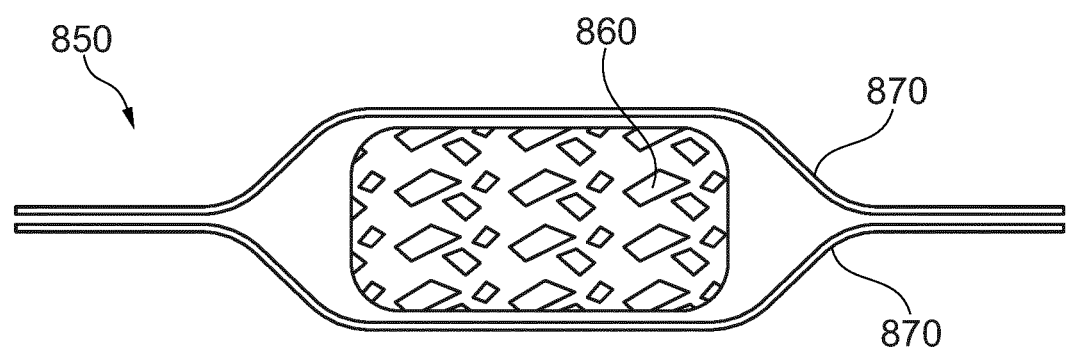

Aspects of the present invention are described in more detail in the following by reference to the accompanying figures. These figures show:

FIG. 1 a schematic illustration of an embodiment of a shoe, comprising for the most part materials of the same material class;

FIG. 2 a schematic illustration of a first part of a recycling process of a shoe, which results in a plurality of mixed particles;

FIG. 3 a schematic illustration of a second part of a recycling process of a shoe, which results in different base components used to manufacture a new shoe;

FIG. 4 a schematic illustration of an embodiment of a cutting patter for a shoe upper, comprising marked areas for reinforcement elements;

FIG. 5 a schematic illustration of an embodiment of a cutting patter for a shoe upper, comprising marked areas for a lining;

FIG. 6 a schematic illustration of an embodiment of a shoe, comprising marked areas for reinforcement elements;

FIG. 7 a schematic illustration of an embodiment of a strobel board;

FIG. 8a a schematic illustration of an embodiment of a cutting patter for a shoe upper, comprising marked areas for padding and/or cushioning elements; and FIG. 8b a schematic illustration of a pocket-construction for a padding and/or cushioning element.

BRIEF DESCRIPTION

The above-mentioned problem is at least partly solved by the subject matter of the independent claims. Exemplary embodiments of the invention are defined in the dependent claims.

In an embodiment, the present invention provides a method for recycling a shoe. The shoe comprises various components made from the same material class with varying densities. In fact, all of the shoe may be provided from the same material class. The method comprises milling the shoe to obtain a plurality of particles, the particles having different material densities; mixing the particles; applying heat to the mixed particles to obtain a melt of molten particles and extruding the melt. The application of heat to obtain the melt of molten particles may be achieved e.g. by respective heating means. Such heating means may be provided as a separate module to an extrusion device. Alternatively, or additionally, the application of heat to obtain the melt of molten particles may be achieved in the extruding step. In this embodiment, the particles may be conveyed e.g. from a hopper to at least one nozzle of an extrusion device. Such an extrusion device can comprise a conveyor screw which conveys and compresses the particles. This compression may lead to a melting of the particles while they are conveyed to the at least one nozzle.

The claimed invention therefore provides a method to obtain a melt of molten particles which may be used as a raw material for the manufacture of a new shoe. Due to the melting of the particles, the materials of different densities are essentially homogeneously mixed, which allows to provide either directly new high-quality shoe components from the mixture or intermediate products such as pellets, which can then at a later stage be used for the manufacture of shoe components in the same way as new material pellets or the like.

In embodiments of the invention, the method of recycling a shoe further comprises the step of applying heat and pressure to the shoe, in particular prior to the milling.

In this manner, the shoe, especially a TPU textile of the shoe, is heated and pressed before the milling of the shoe. Said pre-heating and pre-compression help to avoid that the milled or shredded shoe materials, especially the milled textile, gets too fluffy and can afterwards not fed into a hopper of an extruder.

In some embodiments of the present invention, the method of recycling a shoe further comprises the step of adding new material to the mixed particles and/or the melt. The new material may be unrecycled material of the same material class as the shoe.

In this manner, by adding some unrecycled material from the same material class the quality of the mixture is further enhanced leading to the same or almost the same properties as if only new material was used.

Alternatively, or in addition, the new material may also be from a different material class e.g. a chemical optimizer. Such additives may help to further improve the quality and physical and chemical properties of future shoe components made from the recycled material.

The additive may be a reactive system, in particular a bi-functional isocyanate, a trifunctional isocyanate, a bifunctional epoxide or a multifunctional epoxide.

Due to the mechanical forces and heat with milling/shredding, melting and extruding, polymer materials like TPU tend to degrade their molecular structure, resulting in shorter macromolecular chains (=decrease in molecular weight). This in turn will lead to a deterioration of resulting properties, like decreased strength, stiffness, hardness and ductility (e.g. elongation at break). In order to get the molecular weight back up to a level required to achieve suitable application properties, additives may be added to the mixed particles. Such additives may be reactive systems, in particular one of the reactive systems listed above. Adding such additives, in particular a bi-functional isocyanate as a masterbatch at 1-4 weight-%, has proven to lead to improved tensile strength and stiffness, reaching or even exceeding virgin material properties. By choosing a distinct relation of additive, recycled material and virgin TPU (of distinct Shore hardness), properties of the melt and extrudate may be tailored to the application needs. Aforesaid additives especially enable multiple recycling loops.

In some embodiments the single material class comprises a thermoplastic polymer, in particular thermoplastic polyurethane, TPU, or polyamide. The majority of weight of the shoe may be made from the same material class, in particular wherein at least 70%, preferably at least 80%, more preferably at least 90%, and most preferably at least 95% of the weight of the shoe are made from the same material class.

In some embodiments of the present invention, the method of recycling a shoe further comprises the step of sieving the mix of milled particles and/or the melt. By sieving the mix of milled particles and/or the melt, possible contaminations like e.g. dirt or soil originating from the used shoe to be recycled may be filtered out to result in an intermediate product essentially free from impurities.

Further, the step of extruding may comprise extruding an intermediate product, in particular pellets, for further thermoplastic processing. In this manner, the present invention may allow to produce an intermediate product, which may be stored for a period of time or transported to a different location. The stored pellets can then be used in standard thermoplastic production techniques such as injection molding, blow molding etc. In other words, the handling of the recycled material does not or not significantly differ from the handling of a corresponding new raw thermoplastic material for shoe manufacture.

In one embodiment, the intermediate product, in particular the pellets, are further processed in a melt-blowing process to manufacture a melt-blown non-woven fabric of a new shoe. In this context, the intermediate product, in particular the pellets, may be used as a base material to produce the melt-blown non-woven fabric. For example, the intermediate product may be heated and extruded. The extrusion may be executed using a plurality of fine nozzles to produce filaments from the single material class. In this context, the melt may be extruded through a dye comprising a plurality of fine nozzles such that the melt exits the nozzles in the form of filaments with diameters in the range of micrometers or even nanometers. In an embodiment, the filaments are TPU filaments. The TPU can comprise various grades (e.g. 1164D, 1180A). The filaments may be blown by a gas stream, e.g. an air stream, onto a substrate to form a non-woven fabric. The substrate may be planar shaped or three-dimensional shaped, e.g. in the form of a last for producing an upper of a shoe. The substrate also may be a conveyor belt or a substrate layer on such a conveyor belt. The non-woven fabric component may be a reinforcement component. The non-woven fabric component may be a toe box, an internal cage element, an external cage element, or a tongue element (implemented as a single non-woven fabric layer or combined with a different fabric layer). In yet another embodiment, the non-woven fabric layer may form a lasting board or at least a part of it.

Furthermore, in some embodiments, the step of extruding comprises extruding an intermediate product adapted for the manufacture of a new shoe without further thermoplastic processing.

These embodiments of the present invention may allow to produce an intermediate product of a new shoe, which in particular may be a film component, which may be cut and stitched into a desired element of a new shoe. By directly producing such an intermediate product, multiple heat stress due to a further melting process may be omitted. This leads to components for a new shoe of high quality even though originating mostly or even entirely from a recycled shoe.

Alternatively, to extruding an intermediate product in form of a film component, extruding an intermediate product in a melt-blowing process to manufacture a melt-blown non-woven fabric is also applicable. In this manner, the various advantages and processing options provided above when using an intermediate product in form of pellets as source material for the melt-blowing process also apply when extruding the intermediate product directly in a melt-blowing process.

In some embodiments of the present invention, the method of recycling a shoe further comprises the step of producing a new shoe or a component for a new shoe using the extruded melt. The component can comprise a single layer or a composite construction. The component may consist of a film, a non-woven, a knit, a woven, a mesh or a combination thereof. Various single layers of the composite construction of the component may be directly joint by heat, through a mechanical or chemical intertangling process, by an additional adhesive in liquid, film or powder shape or a sewing process.

In an embodiment, the component may comprise a reinforcement element, in particular a toe box, a medial quarter panel, a lateral quarter panel, a tongue, a collar or a heel area. The reinforcement element may be arranged internally or externally on the shoe. The internal surface of a shoe is the surface, adapted to be in contact with a wearers foot. reinforcement element as well as individual layers thereof may be joint for example by heat, through a mechanical or chemical intertangling process or by an additional adhesive in liquid, film or powder shape or a sewing process.

In another embodiment, the component may comprise a lining. The lining may be used in either a full upper construction or at least one partial area of the upper. The lining can increase a wearing comfort, a thermophysiological properties of the shoe or may be used to cover and/or cushion other elements, in particular uncomfortable elements, of the shoe. The lining as well as individual layers thereof may be joint for example by heat, through a mechanical or chemical intertangling process or by an additional adhesive in liquid, film or powder shape or a sewing process.

In a further embodiment, the component may comprise a strobel board. The strobel board may be manufactured by coating a fabric with one or multiple layers of a film in either an inline or a multi-step process. The strobel board as well as individual layers thereof may be joint for example by heat, through a mechanical or chemical intertangling process or by an additional adhesive in liquid, film or powder shape or a sewing process.

In yet a further embodiment, the component may comprise sockliner. The sockliner may be used to cover a strobel board for increased wearing comfort. The sockliner as well as individual layers thereof may be joint for example by heat, through a mechanical or chemical intertangling process or by an additional adhesive in liquid, film or powder shape or a sewing process.

In another embodiment, the component may comprise a padding and/or cushioning element. The padding and/or cushioning element may be used for example in a collar, a heel or a tongue area of the shoe. The padding and/or cushioning element may comprise a pocket-construction comprising a filling fused between two or multiple layers of a film or foil material. In this respect, the pocket material may comprise a recycled film or foil material, in particular recycled TPU. The filling may comprise shredded or milled material. The padding and/or cushioning element as well as individual layers may be joint for example by heat, through a mechanical or chemical intertangling process or by an additional adhesive in liquid, film or powder shape or a sewing process.

The step of producing may comprise a plurality of extrusion steps with different processing parameters.

The different processing parameters allow to optimize certain components of the shoe. For example, the extrusion may be executed using a fine nozzle to directly produce a yarn from the single material class, which could be further processed e.g. woven or knitted, into an upper of the recycled shoe. Alternatively, extruding the melt may be executed using a plurality of fine nozzles to directly produce filaments from the single material class, which could be further processed, e.g. in a melt blowing process, to form a melt-blown non-woven fabric of a new shoe. The melt may be extruded through a dye comprising a plurality of fine nozzles such that the melt exits the nozzles in the form of filaments with diameters in the range of micrometers or even nanometers. In an embodiment, the filaments are TPU filaments. The TPU can comprise various grades (e.g. 1164D, 1180A). The filaments may be blown by a gas stream, e.g. an air stream, onto a substrate to form a non-woven fabric. The substrate may be planar shaped or three-dimensional shaped, e.g. in the form of a last for producing an upper of a shoe. The substrate also may be a conveyor belt or a substrate layer on such a conveyor belt. The non-woven fabric component may be a reinforcement component. The non-woven fabric component may be a toe box, an internal cage element, an external cage element, or a tongue element (implemented as a single non-woven fabric layer or combined with a different fabric layer). In yet another embodiment, the non-woven fabric layer may form a lasting board or at least a part of it.

According to another aspect, the present invention relates to a shoe comprising a material obtained by a recycling method of any of the above-mentioned embodiments.

Another aspect of the present invention relates to an apparatus adapted to recycle a shoe. The shoe comprises various components made from the same material class with varying densities. The apparatus comprises means to perform a method of any of the above-mentioned embodiment. In particular, the apparatus comprises means for milling the shoe to obtain a plurality of particles, the particles having different material densities, means for mixing the particles, means for applying heat to the mixed particles to obtain a melt of molten particles and means for extruding the melt. In some embodiments, the apparatus further comprises means for sieving the mix of milled particles and/or the melt, in particular a sieve.

In another embodiment, the apparatus further comprises means for heating the shoe prior to its milling and means for compressing the shoe prior to its milling. By pre-heating and pre-compressing, it may be avoided that the milled or shredded shoe materials, especially the milled textile, gets too fluffy and can afterwards not fed into a hopper of an extruder.

Furthermore, the apparatus can comprise a dye comprising a plurality of fine nozzles. Especially, the means for extruding can comprise such a dye which enables that extruding the melt may be executed using the plurality of fine nozzles to directly produce filaments from the single material class, which could be further processed, e.g. in a melt blowing process, to form a melt-blown non-woven fabric of a new shoe. The melt may exit the nozzles in the form of filaments with diameters in the range of micrometers or even nanometers. In an embodiment, the filaments are TPU filaments. The TPU can comprise various grades (e.g. 1164D, 1180A). The apparatus may further comprise means for generating gas stream, e.g. an air stream and a substrate. The extruded filaments may be blown by the gas stream onto the substrate to form a non-woven fabric. The substrate may be planar shaped or three-dimensional shaped, e.g. in the form of a last for producing an upper of a shoe. The substrate also may be a conveyor belt or a substrate layer on such a conveyor belt. The non-woven fabric component may be a reinforcement component. The non-woven fabric component may be a toe box, an internal cage element, an external cage element, or a tongue element (implemented as a single non-woven fabric layer or combined with a different fabric layer). In yet another embodiment, the non-woven fabric layer may form a lasting board or at least a part of it.

The means for extruding may comprise means for extruding an intermediate product, in particular pellets, for further thermoplastic processing. In other embodiments, the means for extruding of an intermediate product comprises means for cutting the extruded melt. Thus, it may be possible to directly cut the extruded melt into a desired size of e.g. the pellets, during the process of extrusion of the melt.

It may be noted that additionally, to the usage of post-consumer material by milling and extruding worn shoes, the usage of post-processing waste is possible. This waste can come from various manufacturing processes along the material supply chain, such as scrap or defective material from e.g. yarn spinning, extruding, cutting or assembly processes. The post-processing waste is then processed in the same way as the post-consumer waste prior, during and after the recycling process.

Further aspects of the present invention are defined in the dependent claims.

DETAILED DESCRIPTION

In the following, exemplary embodiments of the present invention are described in more detail with reference to a recycling process of a shoe which comprises for the most part materials of the same material class. While specific feature combinations are described in the following with respect to the exemplary embodiments of the present invention, it is to be understood that the disclosure is not limited to such embodiments. In particular, not all features have to be present for realizing the invention, and the embodiments may be modified by combining certain features of one embodiment with at least one feature of another embodiment. Moreover, while embodiments of the present invention are illustrated in the following with respect to a recycling process of a shoe, it should be appreciated that the same process can also be used to recycle different pieces of apparel, comprising for the most part the same material class with different material densities.

FIG. 1 depicts an illustration of a shoe 100 as disclosed in EP 3 081 109 B1. The shoe 100, which may in particular be a sports shoe, comprises an upper 120, wherein a majority by weight of the upper 120 is made from a thermoplastic base material. Further, the shoe comprises a sole 110, wherein a majority by weight of the sole 110 is made from the same thermoplastic base material. By providing shoes with a sole 110 and an upper 120 which—by majority or even entirely—consist of the same base material, the entire shoe 100 may be recycled according to embodiments of the present invention.

FIG. 2 schematically depicts an illustration of parts 200 of a recycling process of the present invention. In embodiments, the process 200 contains the process step 210 of milling an old shoe 100 by using e.g. rotating cutting units 211 or any other suitable device to obtain a plurality of particles 212. The particles 212 may have different material densities. The milled particles 212 may be collected in a container 243, which may be equipped with one or multiple mixing units such as impellers 241 to generate a more or less homogenous mixture 242 of the particles 212. In addition, there may be heating means, in order to heat the mixture 242 (not shown in FIG. 2).

The process 200 may further comprise a step of adding 220 new material, wherein the new and unrecycled material 221 is from the same material class as the majority of materials of the old shoe 100. Adding some unrecycled material 221 from the same material class may further improve the quality of the mixture 242 leading to the same or almost the same properties as if only new material was used. The new material 221 may be also added 220 into the container 243 and mixed in a step 240 with the milled particles 212 of the old shoe 100 to produce a mixture of particles 242.

Alternatively, or in addition, the process 200 may also include the step of adding 230 new material, wherein the new material 231 is from a different material class e.g. a chemical optimizer. Such additives, for example chain extenders, may help to further improve the quality, i.e. the physical and chemical properties, of future shoe components made from the recycled material. For example, the chain length of the polymers may be increased to affect the stability of any future component made from the recycled material.

Such additives 231 may also be added into the container 243 and thoroughly mixed 240 with the milled particles 212. In some embodiments all three different particles, namely: milled particles 212 of recycled shoe material with different densities, new and unrecycled particles 221 and new particles from a different material class 231 may be mixed 240 in the container 243 to obtain a homogenous mixture 242 thereof. The aggregate of some or even all the different particles may be liquid, gaseous, solid or in any other possible state.

In some embodiments the resulting mixed particles 242 may be transferred (not shown) into another container to be either stored, shipped to a different building, factory, company or some other place. In other embodiments, the mixed particles 242 may be directly further processed in a recycling process 300 as shown in FIG. 3.

FIG. 3 schematically depicts an illustration of parts 300 of a recycling process of the present invention, which may be a continuation of the process 200 illustrated in FIG. 2. In embodiments, the homogenous mixture of particles 242 may be transferred into a hopper 311, which may direct the mixture of particles 242 into an extruder 317. The extruder may comprise a heating system 312 to melt the particles and a screw conveyor 313 to transport the mixture and/or melt of particles through the extruder 317. The extruder 317 may further contain a sieve 314 located, in some embodiments, at the end part of the extruder, at which the mixture of particles should at least be partly or completely melted. By sieving the milled particles and/or the melt, possible contaminations like e.g. dirt or soil originating from the old shoe 100 to be recycled, may be filtered out to result in an intermediate product 318 essentially free from impurities. Such a sieving process may allow to omit a separate costly cleaning procedure of the old shoe 100. Exchanging and/or cleaning of the sieve 314 may be conducted on a regular basis using fully automated processes or may be done manually (not shown in FIG. 3).

The intermediate product 318 may be further processed in various ways, three of which are also schematically depicted in FIG. 3. In the first embodiment, shown as process 310, the melted intermediate product 318 may be extruded through a fine nozzle 315 to produce a yarn 316. The yarn 316 may be rolled onto a yarn bobbin 319 or be directly used for further processing of e.g. a fabric 306 of an upper 303, laces 304 or seams 305 of the new shoe 301.

In the second embodiment, shown as process 320, the melted intermediate product 318 may be extruded as a film component 322 using at least one pressure roller 321. The film component 322 may be stored on a roll 323 or may be directly used for further processing of e.g. the manufacture of a component of an upper 303 of the new shoe 301. The further processing may be performed without additional thermoplastic treatment of the film component 322, which keeps the level of thermal stress of the material of the film component 322 as low as possible to ensure a high-quality recycled product.

In a third embodiment, shown as process 330, the melted intermediate product 318 may be cut into small pellets 332 or the like using a cutting disc, shears 331 or any other possible cutting device. The pellets 332 may be stored in a container or bag (not shown) to be either shipped to a different building, factory, company or some other place or be directly used for further processing of e.g. a sole 302 of the new shoe 301 using standard thermoplastic production techniques.

The three different embodiments of processing the melted intermediate product 318 shown in FIG. 3 are only exemplary. This should not limit the scope of the present invention. Furthermore, the splitting of the recycling process into two different parts 200 and 300 is only for facilitating the description of the present invention. In some embodiments, the two processing parts 200, 300 may be completely merged into one process implemented by a single device.

FIG. 4 depicts a schematic illustration of a cutting pattern 400 for a shoe upper. The cutting pattern comprises marked areas 410, 420, 430, in which an arrangement of a reinforcement element manufactured from recycled material in accordance with the present invention may be beneficial. The reinforcement element may for example be used in a toe box 410, a medial and/or lateral quarter panel 420, a tongue (not marked in FIG. 4), a collar area (not marked in FIG. 4) or a heel area 430 of the shoe upper to increase stability of the upper construction, however different areas are also possible. Furthermore, the reinforcement element may increase a wearing comfort for a wearer.

FIG. 5 depicts a schematic illustration of a cutting patter 500 for a shoe upper. The cutting pattern comprises marked areas 510, 520, in which an arrangement of a lining manufactured from recycled material in accordance with the present invention may be beneficial. The lining may be either used in partial areas of an upper construction, such as a rear foot area 510 or a front foot area 520 or in the full upper construction (not shown in FIG. 5). The lining may increase wearing comfort, thermophysiological properties of the shoe. Furthermore, the lining can may also be used to cover hard and/or uncomfortable areas on the upper construction.

FIG. 6 depicts an illustration of a shoe 600 in accordance with the present invention. The shoe 600 comprises an upper 601 and a sole 602. The upper 601 comprises further embodiments of a reinforcement element manufactured from recycled material in accordance with the present invention, which may be arranged on an external or internal surface of the shoe upper. The reinforcement element may also be arranged between various layers of the upper 601. Furthermore, the reinforcement element may comprise a heel support 610 and/or a midfoot support 620, however reinforcement of different areas is also possible. The reinforcement element may be manufactured by a molding process to pre-shape or directly fuse the reinforcement element onto the upper 601.

FIG. 7 depicts a schematic illustration of a strobel board 700 in top view 700-a and a side view 700-b. The strobel board 700 is produced out of recycled material in accordance with the present invention by coating a fabric 720 with one or multiple layers of film, in particular a TPU fabric 720 and a TPU coating 710. The coating may be an in line or multi-step process. The fabric 720 can hereby consist of a non-woven, a knit, a woven or a mesh or any combination of those materials. A sockliner manufactured from recycled material in accordance with the present invention may be used to cover the strobel board and increase the wearing comfort.

FIG. 8a depicts a schematic illustration of a cutting pattern 800 for a shoe upper. The cutting pattern 800 comprises marked areas 810, 820, in which an arrangement of a padding and/or cushioning element 850 manufactured from recycled material in accordance with the present invention may be beneficial. The padding and/or cushioning element 850 can for example be used in a collar 810, a heel area (not shown in FIG. 8a) or a tongue 820 area, however different areas are also possible. The recycled material may comprise particles of shredded or milled shoes, components of shredded or milled shoes and/or post-processing waste. The post-processing waste can come from various manufacturing processes along the material supply chain, such as scrap or defective material from yarn spinning, extruding, cutting or assembly processes.

FIG. 8b depicts a schematic illustration of a padding and/or cushioning element 850 in a side view. The cutting and/or padding element 850 comprises a pocket format, in which shredded or milled particles 860 of recycled material are fused between two or more layers 870 of a film component of recycled material. Preferably the film component 870 and the shredded or milled particles 860 comprise TPU.

EMBODIMENTS

Example 1: A method for recycling a shoe (100), the shoe (100) comprising various components made from the same material class with varying densities, the method comprising: a. milling (210) the shoe (100) to obtain a plurality of particles (212), the particles (212) having different material densities; b. mixing (240) the particles; c. applying heat (312) to the mixed particles (242) to obtain a melt of molten particles; and d. extruding (317) the melt.

Example 2: Method according to Example 1, further comprising the step of applying heat and pressure to the shoe, in particular prior to the milling (210).

Example 3: Method according to Example 1 or 2 further comprising the step of adding (220, 230) new material to the mixed particles (242) and/or the melt.

Example 4: Method according to Example 3, wherein the new material (221) is unrecycled material of the same material class as the shoe (100).

Example 5: Method according to Example 3 or 4, wherein the new material (231) is from a different material class.

Example 6: Method according to Example 5, wherein the new material is an additive, wherein the additive is a reactive system, in particular a bi-functional isocyanate, a trifunctional isocyanate, a bifunctional epoxide or a multifunctional epoxide.

Example 7: Method according to any of the preceding Examples, wherein the single material class comprises a thermoplastic polymer, in particular thermoplastic polyurethane, TPU, or polyamide.

Example 8: Method according to any of the preceding Examples, wherein the majority of weight of the shoe (100) is made from the same material class, in particular wherein at least 70%, preferably at least 80%, more preferable at least 90%, and most preferably at least 95% of the weight of the shoe (100) are made from the same material class.

Example 9: Method according to any of the preceding Examples, wherein the step of extruding (317) comprises extruding an intermediate product (318), in particular pellets (332), for further thermoplastic processing, in particular in a melt-blowing process to manufacture a melt-blown non-woven fabric.

Example 10: Method according to any of the preceding Examples 1-8, wherein the step of extruding (317) comprises extruding an intermediate product (318) adapted for the manufacture of a new shoe (301) without further thermoplastic processing, in particular in a melt-blowing process to manufacture a melt-blown non-woven fabric.

Example 11: Method according to any of the preceding Examples, further comprising the step of producing a new shoe (301) or a component for a new shoe using the extruded melt.

Example 12: Method according to Example 11, wherein the component for the new shoe comprises a padding and/or cushioning element (850).

Example 13: Method according to Example 11 or 12, wherein the step of producing comprises a plurality of extrusion steps (310, 320, 330) with different processing parameters.

Example 14: Shoe (301) comprising a material obtained by a recycling method (200, 300) according to any of the preceding Examples.

Example 15: Apparatus, adapted to recycle a shoe (100), the shoe (100) comprising various components made from the same material class with varying densities, the apparatus comprising means to perform a method according to any of the preceding Examples 1 to 13.

The invention claimed is:
1. A method for recycling a shoe, the shoe comprising various components made from a same material class with varying densities, wherein a majority of a weight of the shoe is made from the same material class and wherein the material class is thermoplastic polyurethane or polyamide, the method comprising:
   a. milling the shoe to obtain a plurality of particles, the particles having different material densities;
   b. mixing the particles;

c. applying heat to the mixed particles to obtain a melt of molten particles; and
d. extruding the melt;
wherein the step of extruding comprises extruding an intermediate product adapted for the manufacture of a new shoe without further thermoplastic processing, and
wherein the intermediate product is a yarn, a film component, or extruded in a melt-blowing process to manufacture a melt-blown non-woven fabric.

2. The method according to claim 1, further comprising applying heat and pressure to the shoe.

3. The method according to claim 1, further comprising adding new material to the mixed particles and/or the melt.

4. The method according to claim 3, wherein the new material is an unrecycled material of the same material class as the shoe.

5. The method according to claim 3, wherein the new material is from a different material class.

6. The method according to claim 5, wherein the new material is an additive comprising a bi-functional isocyanate, a trifunctional isocyanate, a bifunctional epoxide or a multifunctional epoxide.

7. The method according to claim 1, wherein the same material class comprises thermoplastic polyurethane.

8. The method according to claim 1, wherein at least 70% of the weight of the shoe is made from the same material class.

9. The method according to claim 1, wherein at least 80% of the weight of the shoe is made from the same material class.

10. The method according to claim 1, wherein at least 90% of the weight of the shoe is made from the same material class.

11. The method according to claim 1, wherein at least 95% of the weight of the shoe is made from the same material class.

12. The method according to claim 1, wherein the component for the new shoe comprises a padding and/or cushioning element.

13. The method according to claim 1, wherein the extruding comprises a plurality of extrusion steps with different processing parameters.

* * * * *